United States Patent [19]
Otterbacher et al.

[11] Patent Number: 6,100,795
[45] Date of Patent: Aug. 8, 2000

[54] TRAILER HITCH ALIGNMENT SYSTEM

[76] Inventors: Curtis W. Otterbacher; Marguerite A. Otterbacher, both of 1980 Muntz Rd., Valley City, Ohio 44280

[21] Appl. No.: 09/267,046

[22] Filed: Mar. 12, 1999

[51] Int. Cl.$^7$ ................................................ G08B 21/00
[52] U.S. Cl. ...................... 340/431; 340/471; 340/472; 340/473; 340/429; 307/10.1; 307/10.8; 280/477
[58] Field of Search .................... 340/431, 471, 340/472, 473, 429; 307/10.1, 10.8; 280/477

[56] References Cited

U.S. PATENT DOCUMENTS

| | | | |
|---|---|---|---|
| 3,924,257 | 12/1975 | Roberts | 340/282 |
| 3,938,122 | 2/1976 | Mangus | 340/275 |
| 4,054,302 | 10/1977 | Campbell | 280/477 |
| 4,187,494 | 2/1980 | Jessee | 340/52 R |
| 4,952,908 | 8/1990 | Sanner | 340/429 |
| 5,108,123 | 4/1992 | Rubenzik | 280/477 |
| 5,191,328 | 3/1993 | Nelson | 340/870.06 |
| 5,558,352 | 9/1996 | Mills | 280/477 |
| 5,650,764 | 7/1997 | McCullough | 340/431 |
| 5,951,035 | 9/1999 | Phillips, Jr. et al. | 280/477 |

*Primary Examiner*—Jeffery A. Hofsass
*Assistant Examiner*—Tai T. Nguyen
*Attorney, Agent, or Firm*—Michael S. Neustel

[57] ABSTRACT

A trailer hitch alignment system for allowing a user to easily align a hitch of a vehicle with a trailer hitch. The inventive device includes a control that is mountable to a visor of the vehicle in view of the driver, a receiver unit attachable to the bumper of the vehicle and in communication with the control unit, a transmitter unit removably attachable to a trailer hitch that transmits a locating signal that is detectable by the receiver unit, and a storage case. Electronic circuitry within the control unit determines the position of the transmitter unit from the receiver unit from the reception of the locating signal. The control unit includes a turn right indicator and a turn left indicator for visually indicating to the user whether to turn left or right while backing toward the conventional trailer. The control unit also includes a buzzer and stop indicator light for indicating to the user when the ball hitch is positioned below the coupler of the trailer hitch. The control unit also includes a display screen that visually indicates the position of the vehicle with respect to the trailer hitch. If the user needs to turn left or right, either the turn left indicator or the turn right indicator will display various levels of lights indicating to the user that they must turn appropriately for proper alignment of the vehicle with the conventional trailer.

18 Claims, 5 Drawing Sheets

TRAILER HITCH ALIGNMENT SYSTEM

BACKGROUND OF THE INVENTION

1. Field of the Invention

The present invention relates generally to trailer locating devices and more specifically it relates to a trailer hitch alignment system for allowing a user to easily align a hitch of a vehicle with a trailer hitch.

Users of trailers often have great difficulty in aligning their vehicle's hitch with the trailer hitch of a conventional trailer. The user must back up slowly and repeatedly stop the vehicle and exit the vehicle to determine the new location of the hitch with respect to the trailer hitch so as to not damage the vehicle. This is undesirable for user's who utilize trailers often such as farmers. Hence, there is a need for a trailer hitch alignment system that allows a user to conveniently align a vehicle with a trailer hitch without the user having to exit the vehicle.

2. Description of the Prior Art

Trailers have been in use for years. Typically, a trailer has a plurality of wheels rotatably supporting a frame and a trailer hitch for removably coupling with a vehicle that will be towing the conventional trailer. The user must align the ball hitch of the vehicle with the raised trailer hitch. This is extremely difficult since the ball hitch is usually out of viewing because of its location upon the vehicle's bumper. The user must then slowly back up to the trailer hitch so as to prevent damage to the vehicle and trailer. The user must also repeatedly exit and enter the vehicle so as to allow viewing of the position of the ball hitch with respect to the trailer hitch. This is continued until the ball hitch is directly beneath the ball coupler of the trailer hitch.

The repeated exiting and entering the vehicle is undesirable for most users. In addition, the constant exiting and entering of the vehicle is time consuming and dangerous for the user. Another problem is that vehicle and trailer damage are almost inevitable over a period of time.

Examples of trailer locating devices include U.S. Pat. No. RE28,590 to Salmi; U.S. Pat. No. 5,513,870 to Hickman; U.S. Pat. No. 4,938,495 to Beasley et al; U.S. Pat. No. 4,432,563 to Pitcher; U.S. Pat. No. 4,186,939 to Woods et al; U.S. Pat. 4,187,494 to Jessee; U.S. Pat. No. 4,827,248 to Crudden et at; U.S. Pat. No. 2,818,553 to Jaffe; U.S. Pat. No. 3,731,274 to Green; U.S. Pat. No. 5,405,160 to Weaver which are all illustrative of such prior art.

Salmi (U.S. Pat. No. RE28,590) discloses an apparatus for aligning the couplings on separate vehicles. Salmi teaches a retractable guide line which releasably attaches to the rear of the towing vehicle adjacent the coupling.

Hickman (U.S. Pat. No. 5,513,870) discloses a guidance system for use in docking a movable vehicle with a stationary target. Hickman teaches a tensioned line stored upon a spring and reel assembly within the sensing unit and is adapted to be unreeled therefrom.

Beasley et al (U.S. Pat. No. 4,938,495) discloses a trailer hitch positioning apparatus. Beasley ct al teaches the use of an infrared light unit mounted on the trailer for transmitting a light beam toward the vehicle.

Pitcher (U.S. Pat. No. 4,432,563) discloses a hitching guidance device. Pitcher teaches the use of electrical contacts to sense the spatial orientation of a fine braided steel wire.

Woods et al (U.S. Pat. No. 4,186,939) discloses an electromechanical docking apparatus and method. Woods et al teaches a cable means for connecting a first object to a second object and a display means for indicating the relative yaw and distance between said objects.

While these devices may be suitable for the particular purpose to which they address, they are not as suitable for allowing a user to easily align a hitch of a vehicle with a trailer hitch. Conventional devices and methods do not accurately determine the location of the vehicle with respect to the trailer hitch thereby leading to significant damage to the vehicle and the trailer.

In these respects, the trailer hitch alignment system according to the present invention substantially departs from the conventional concepts and designs of the prior art, and in so doing provides an apparatus primarily developed for the purpose of allowing a user to easily align a hitch of a vehicle with a trailer hitch.

SUMMARY OF THE INVENTION

In view of the foregoing disadvantages inherent in the known types of trailer locating devices now present in the prior art, the present invention provides a new trailer hitch alignment system construction wherein the same can be utilized for allowing a user to easily align a hitch of a vehicle with a trailer hitch.

The general purpose of the present invention, which will be described subsequently in greater detail, is to provide a new trailer hitch alignment system that has many of the advantages of the trailer locating devices mentioned heretofore and many novel features that result in a new trailer hitch alignment system which is not anticipated, rendered obvious, suggested, or even implied by any of the prior art trailer locating devices, either alone or in any combination thereof.

To attain this, the present invention generally comprises a control that is mountable to a visor of the vehicle in view of the driver, a receiver unit attachable to the bumper of the vehicle and in communication with the control unit, a transmitter unit removably attachable to a trailer hitch that transmits a locating signal that is detectable by the receiver unit, and a storage case. Electronic circuitry within the control unit determines the position of the transmitter unit from the receiver unit from the reception of the locating signal. The control unit includes a turn right indicator and a turn left indicator for visually indicating to the user whether to turn left or right while backing toward the conventional trailer. The control unit also includes a buzzer and stop indicator light for indicating to the user when the ball hitch is positioned below the coupler of the trailer hitch. The control unit also includes a display screen that visually indicates the position of the vehicle with respect to the trailer hitch. If the user needs to turn left or right, either the turn left indicator or the turn right indicator will display various levels of lights indicating to the user that they must turn appropriately for proper alignment of the vehicle with the conventional trailer.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a trailer hitch alignment system that will overcome the shortcomings of the prior art devices.

Another object is to provide a trailer hitch alignment system that allows a user to easily align a vehicle with a trailer.

An additional object is to provide a trailer hitch alignment system that reduces the number of times the user must exit the vehicle during attachment of a vehicle to a conventional trailer.

A further object is to provide a trailer hitch alignment system that visually indicates the position of the vehicle ball hitch with respect to the conventional trailer.

Another object is to provide a trailer hitch alignment system that does not utilize mechanical devices, switches or cables for the alignment process.

An additional object is to provide a trailer hitch alignment system that can be easily removed for utilization upon multiple trailers.

Another object is to provide a trailer hitch alignment system that indicates to the user whether they should turn right or left when aligning the vehicle with the conventional trailer.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
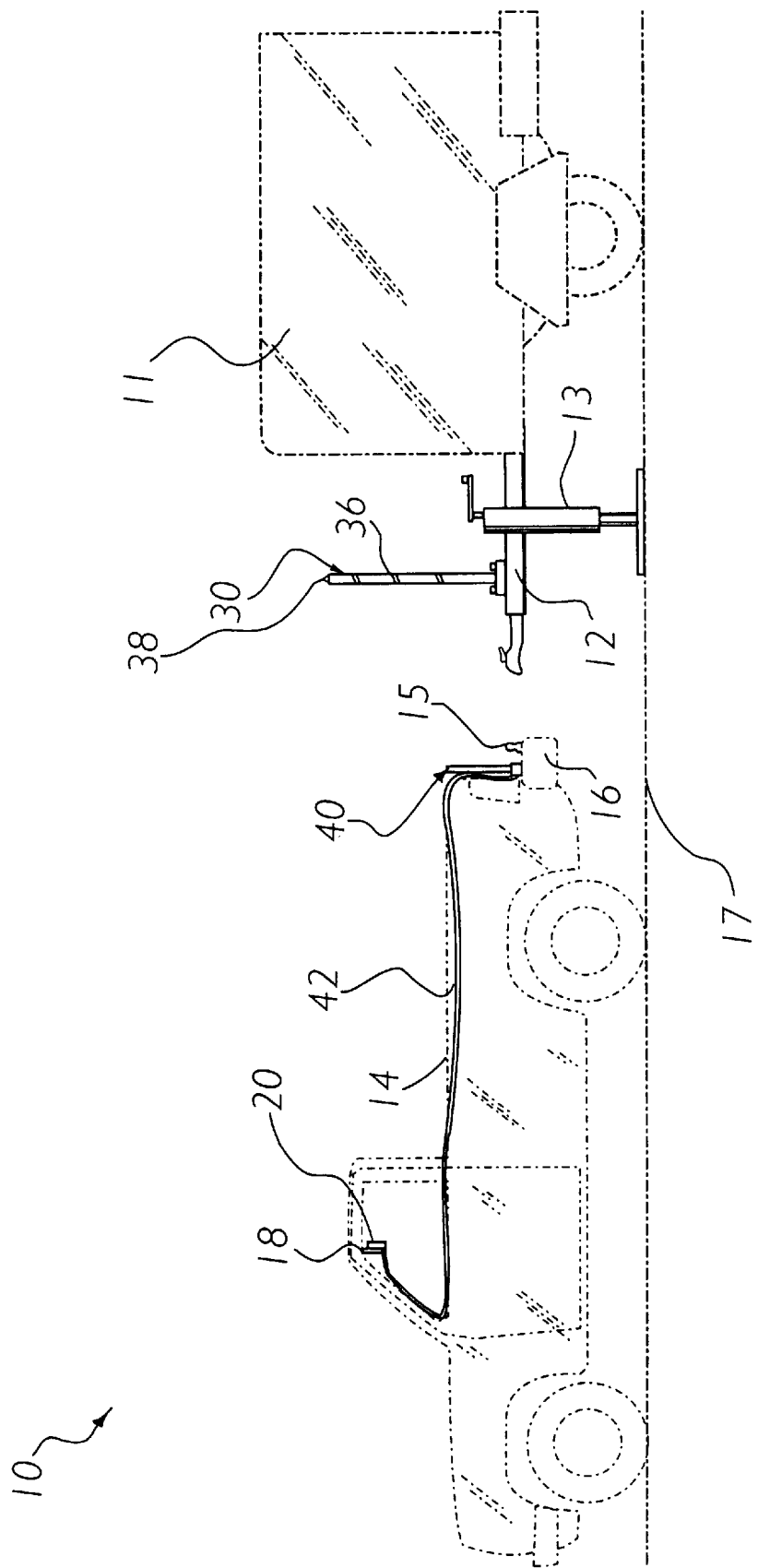
FIG. 1 is a side view of the present invention attached to the vehicle and the trailer hitch.

Turning now descriptively to the drawings, in which similar reference characters denote similar elements throughout the several view, FIGS. 1 through 5 illustrate a trailer hitch alignment system 10, which comprises a control that is mountable to a visor 18 of the vehicle 14 in view of the driver, a receiver unit 40 attachable to the bumper 16 of the vehicle 14 and in communication with the control unit 20, a transmitter unit 30 removably attachable to a trailer hitch 12 that transmits a locating signal that is detectable by the receiver unit 40, and a storage case 50. Electronic circuitry within the control unit 20 determines the position of the transmitter unit 30 from the receiver unit 40 from the reception of the locating signal. The control unit 20 includes a turn right indicator 21 and a turn left indicator 23 for visually indicating to the user whether to turn left or right while backing toward the conventional trailer 11. The control unit 20 also includes a buzzer 25 and stop indicator light 27 for indicating to the user when the ball hitch 15 is positioned below the coupler of the trailer hitch 12. The control unit 20 also includes a display screen 28 that visually indicates the position of the vehicle 14 with respect to the trailer hitch 12. If the user needs to turn left or right, either the turn left indicator 23 or the turn right indicator 21 will display various levels of lights indicating to the user that they must turn appropriately for proper alignment of the vehicle 14 with the conventional trailer 11.

Figure 2:
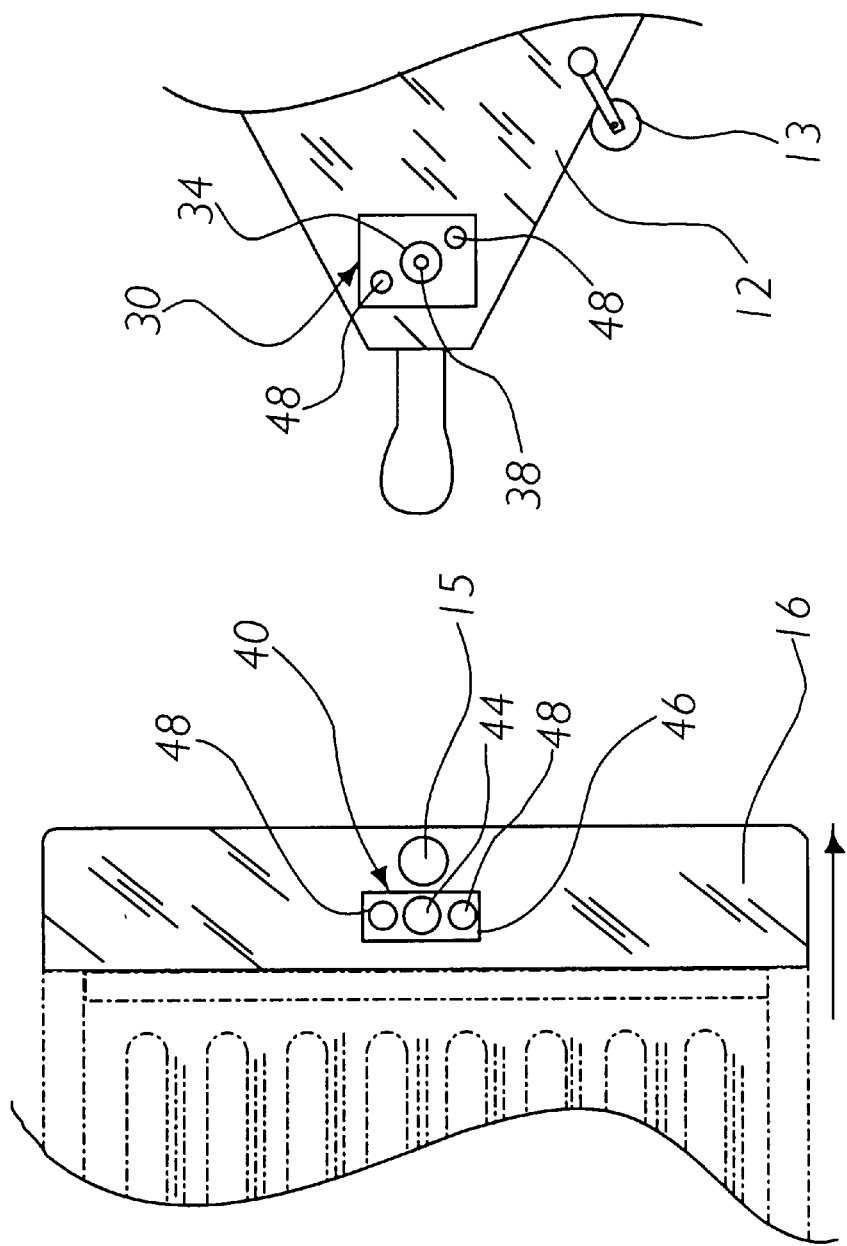
FIG. 2 is a top view of the present invention attached to the vehicle and the trailer hitch.

As shown in FIGS. 1 and 2 of the drawings, a vehicle 14 includes a bumper 16 that removably retains a conventional ball hitch 15 for towing a conventional trailer 11. The conventional trailer 11 includes a trailer hitch 12 to which a coupler is attached for engagement with the conventional ball hitch 15. The trailer hitch 12 also includes a manual jack 13 for elevating the trailer hitch 12 above the ground surface 17 a specific distance as shown in FIG. 1 of the drawings.

Figure 3:
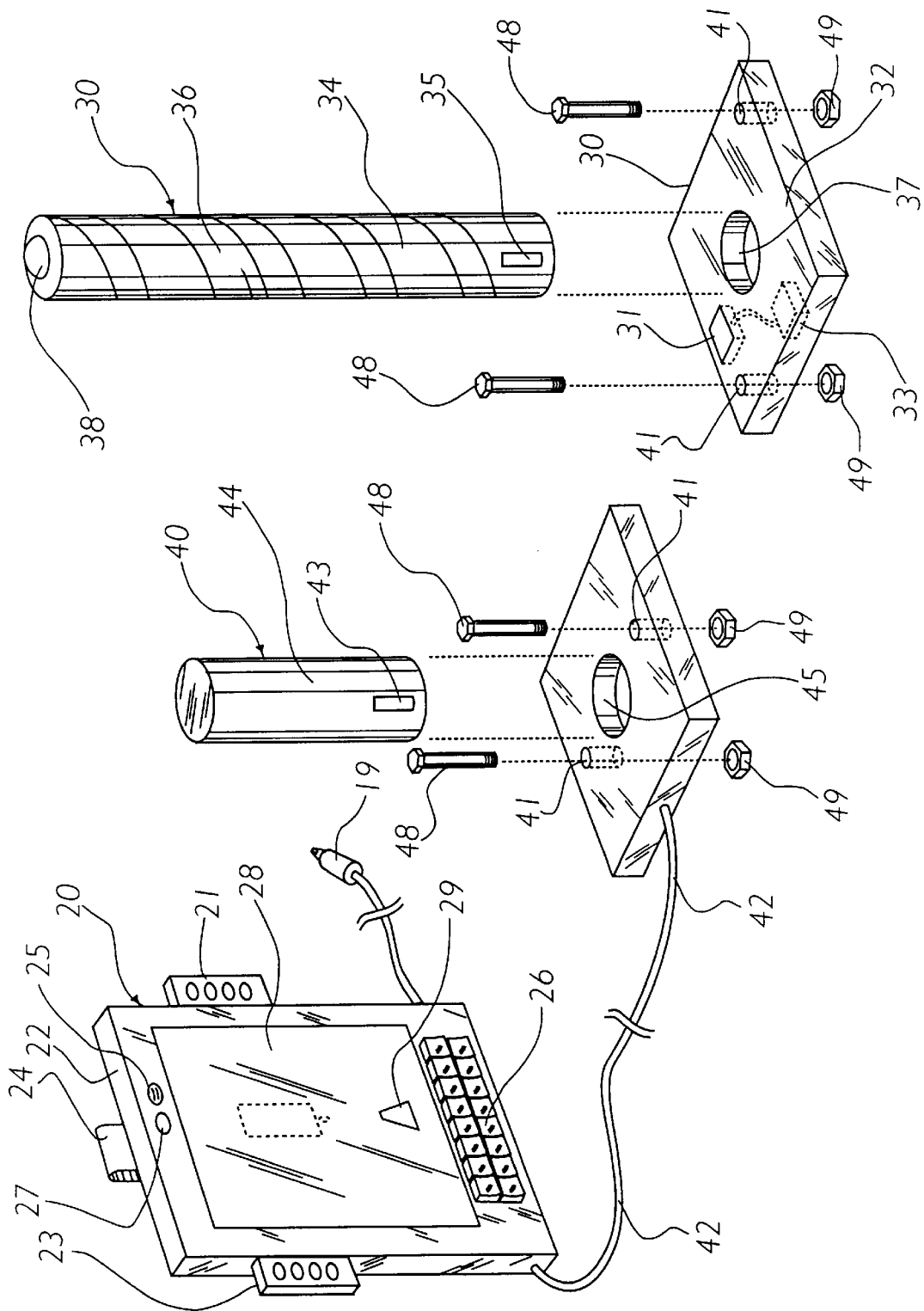
FIG. 3 is an exploded upper perspective view of the present invention.

As best shown in FIGS. 1 through 3 of the drawings, the transmitter unit 30 comprises a transmitter base 32 and a transmitter antenna 34. The transmitter base 32 includes a centrally located transmitter cavity 37 for removably receiving the transmitter antenna 34 for allowing compact storage during non-use, as shown in FIG. 3 of the drawings.

The transmitter antenna 34 includes a pair of transmitter electrodes 35 for allowing electrical coupling to a locating signal generator 33 within the transmitter base 32. The locating signal generator 33 generates a locating signal that is detected by the receiver unit 40. A battery 31 is positioned within the transmitter base 32 and is electrically connected to the locating signal generator 33 as shown in FIG. 3 of the drawings.

The transmitter base 32 preferably includes a plurality of apertures 41 within it for receiving a corresponding plurality of conventional fasteners 48. The conventional fasteners 48 are either directly threaded into the trailer hitch 12 or are threadably engaged with a corresponding plurality of nuts 49 as shown in FIG. 3 of the drawings. In addition to the conventional fasteners 48 attachment means, the transmitter base 32 may be magnetized or magnets may be included within the transmitter base 32 for allowing quick and removable attachment to the trailer hitch 12.

As best shown in FIG. 3 of the drawings, a locating light 38 is preferably attached to the top of the transmitting antenna for visually indicating to the driver the locating of the trailer hitch 12 since the upper portion of the transmitter antenna 34 is viewable from the vehicle 14. The locating light 38 is electrically connected to the battery 31 for providing a constant or blinking light source.

Also, a plurality of visibility strips 36 are attached to the transmitter antenna 34 for increasing the visibility of the transmitter antenna 34 during darkness and lighted conditions. The visibility strips 36 may be constructed of a reflective material for increasing visibility. The visibility strips 36 may also be constructed of material that is luminescent during darkness known as "glowing in the dark".

As best shown in FIG. 3 of the drawings, the receiver unit 40 comprises a receiver base 46 and a receiver antenna 44. The receiver base 46 includes a centrally positioned receiver cavity 45 for removably receiving the receiver antenna 44 as further shown in FIG. 3 of the drawings.

The receiver antenna 44 includes a pair of receiver electrodes 43 for allowing electrical coupling to a communication cable 42 for transmitting the detected locating signal to the control unit 20. As shown in FIG. 3 of the drawings, the receiver unit 40 may be substantially shorter in height than the transmitter antenna 34 since visual indication is not as important.

The receiver base 46 preferably includes a plurality of apertures 41 within it for receiving a corresponding plurality of conventional fasteners 48 as shown in FIG. 3 of the drawings. The conventional fasteners 48 are either directly threaded into the bumper 16 next to the conventional ball hitch 15 or are threadably engaged with a corresponding plurality of nuts 49 as shown in FIG. 3 of the drawings. In addition to the conventional fasteners 48 attachment means, the receiver base 46 may be magnetized or magnets may be included within the receiver base 46 for allowing quick and removable attachment to the bumper 16 or other structure of the vehicle 14 adjacent the conventional ball hitch 15.

As shown in FIGS. 1 and 3, the communication cable 42 is electrically connected between the receiver unit 40 and the control unit 20. It can be appreciated by on skilled in the art that other forms of communication, including radio frequency, may be utilized to communicate between the receiver unit 40 and the control unit 20.

As best shown in FIG. 3, the control unit 20 comprises a housing 22, a display screen 28 within the housing 22 and a keypad 26 within the housing 22. A clip 24 is attached to the rear of the housing 22 allowing removable attachment to a visor 18 within the vehicle 14. The housing 22 and display are preferably rectangular in shape, however any other well-known shape may be utilized. A hitch indicia 29 is printed upon the display screen 28 so as to represent the position of the trailer hitch 12 while the display screen 28 illuminates a shape of the vehicle 14 being aligned with the conventional trailer 11 as shown in FIG. 3 of the drawings.

Figure 5:
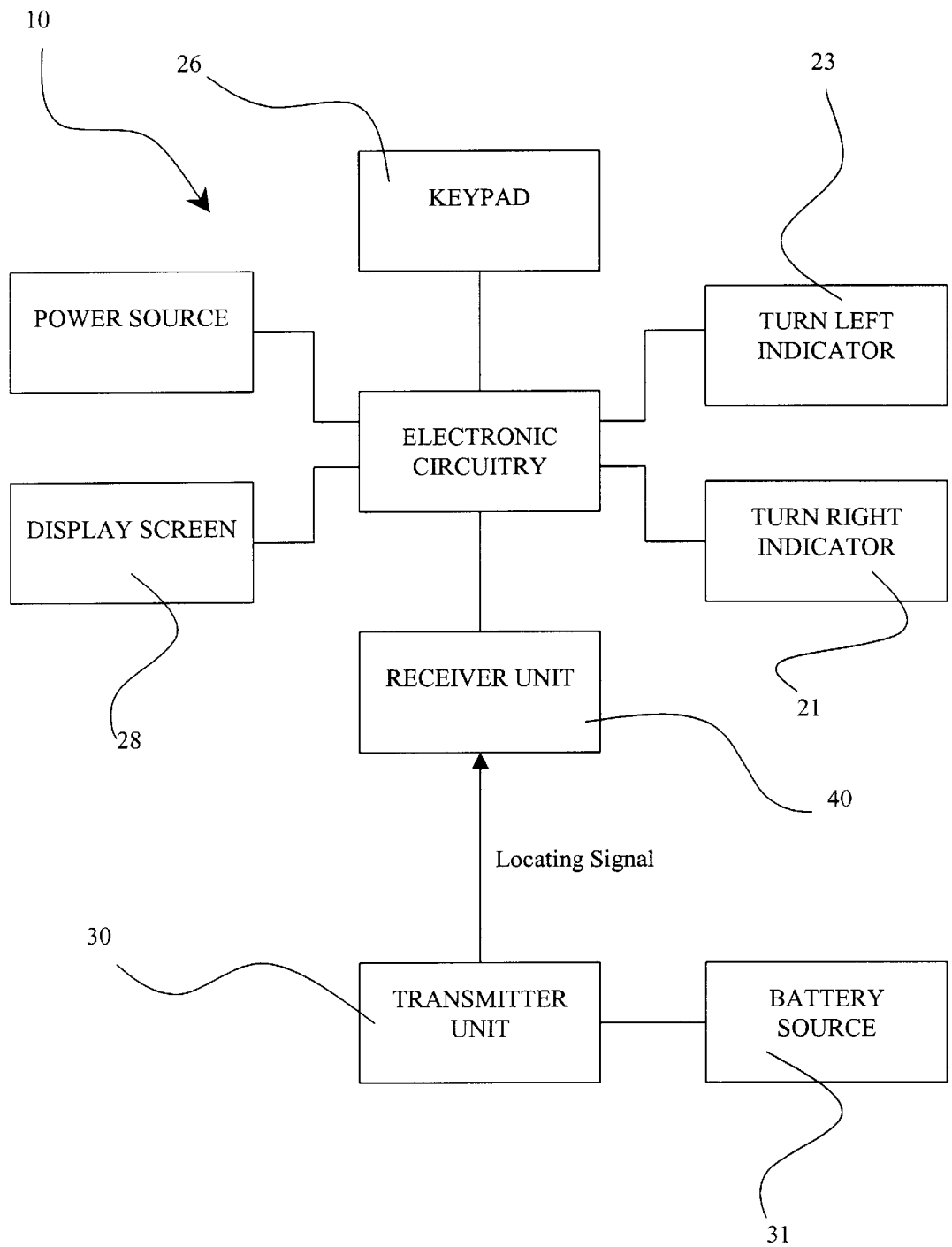
FIG. 5 is a block diagram illustrating the present invention.

An electronic circuitry is positioned within the housing 22 of the control unit 20 and is electrically connected to the display screen 28 and the keypad 26 as shown in FIG. 5 of the drawings. A cigarette lighter adapter 19 is electrically connected to the electronic circuitry for providing electrical power to the electronic circuitry. It can be appreciated that a battery 31 may be included within the control unit 20.

The electronic circuitry is also in communication with the receiver unit 40 via the communication cable 42. The electronic circuitry receives a communication signal that carries information regarding the locating signal so that the electronic circuitry may determine the location of the transmitter unit 30 from the receiver unit 40.

Upon determining the location of the transmitter unit 30 with respect to the receiver unit 40 and the motion of the vehicle 14, the electronic circuitry displays the location of the vehicle 14 information upon the display screen 28 as shown in FIG. 3 so the driver knows the position of the vehicle 14.

As shown in FIG. 3, the control unit 20 includes a turn right indicator 21 and a turn left indicator 23 for visually indicating to the user whether to turn left or right while backing toward the conventional trailer 11. The indicators 21, 23 are electrically connected to the electronic circuitry as shown in FIG. 5 of the drawings. If the user needs to turn left or right, either the turn left indicator 23 or the turn right indicator 21 will display various levels of lights indicating to the user that they must turn appropriately for proper alignment of the vehicle 14 with the conventional trailer 11. The more lights showing upon either of the indicators 21, 23 means that the user must turn sharper in order to properly align the vehicle 14 with the conventional trailer 11.

As shown in FIG. 3 of the drawings, the control unit 20 also includes a buzzer 25 and stop indicator light 27 for indicating to the user when the ball hitch 15 is positioned below the coupler of the trailer hitch 12. The buzzer 25 and stop indicator light 27 arc electrically connected to the electronic circuitry. The buzzer 25 emits an audible sound when the conventional ball hitch 15 is directly below the coupler of the trailer hitch 12. The stop indicator light 27 is illuminated when the conventional ball hitch 15 is directly below the coupler of the trailer hitch 12 to provide a visual signal to the driver.

Figure 4:
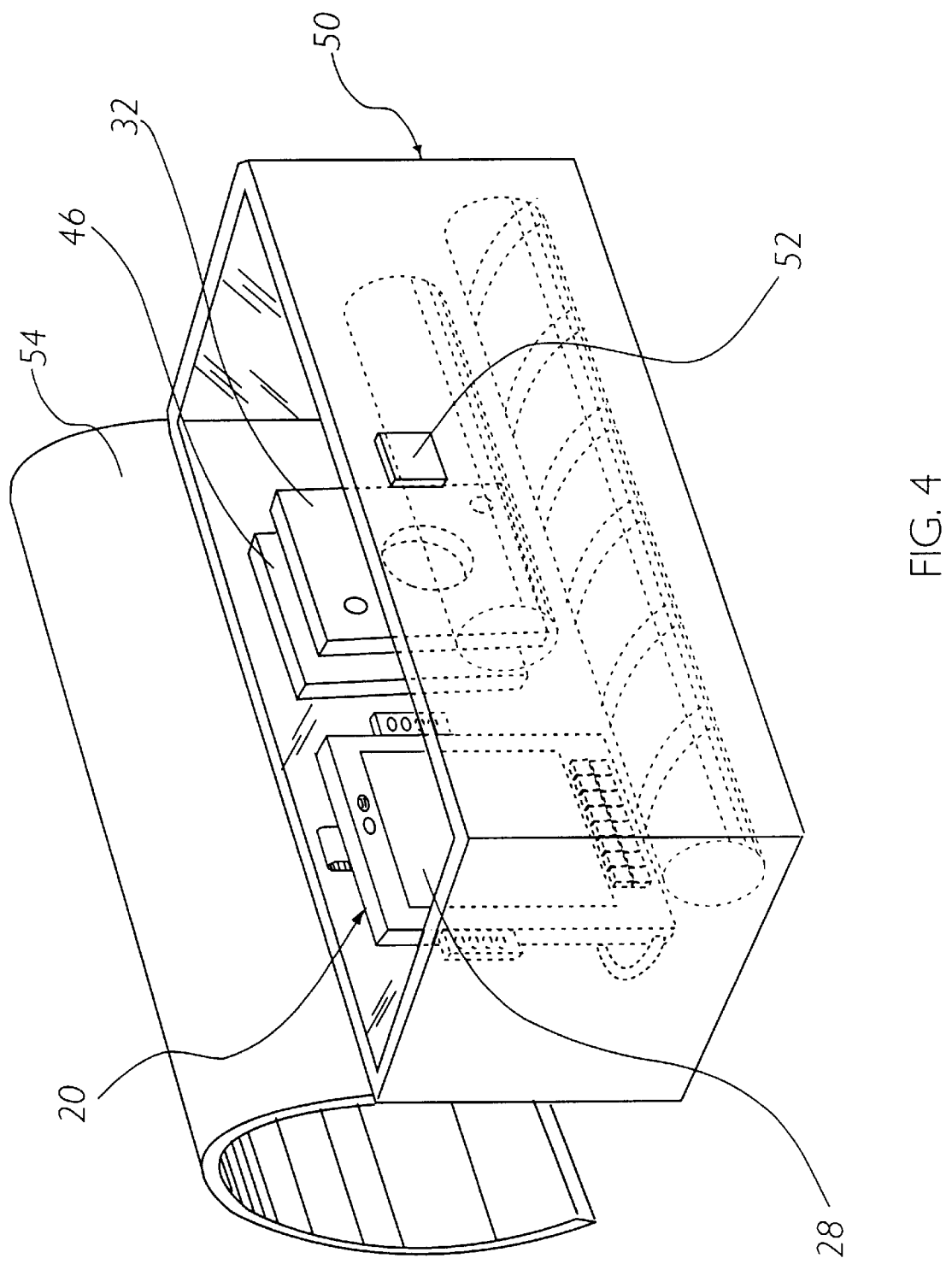
FIG. 4 is an upper perspective view of the present invention enclosed within a storage case.

As shown in FIG. 4 of the drawings, the storage case 50 is preferably rectangular in shape and has a cover 54. A latch 52 is attached to the cover 54 for removably securing the cover 54 over the opening within the storage case 50 when components of the invention are stored within.

In use, the user magnetically secures the transmitter unit 30 to the trailer hitch 12 directly behind the coupler as shown in FIG. 2. The user then magnetically couples the receiver unit 40 to the bumper 16 of the vehicle 14 as best shown in FIG. 2 of the drawings. The communication cable 42 is fed from the receiver unit 40 into the cab of the vehicle 14 as shown in FIG. 1 of the drawings. The user then attaches the control unit 20 to the visor 18 of the vehicle 14 as shown in FIG. 1 of the drawings. The visor 18 is tilted downwardly for allowing complete viewing of the display screen 28. The user then backs the vehicle 14 toward the conventional trailer II as shown in FIG. 2 of the drawings. While the user is backing toward the conventional trailer 11, the locating signal generator 33 is transmitting a locating signal through the transmitter antenna 34 toward the receiver unit 40 that detects the locating signal. The receiver unit 40 thereafter converts the detected locating signal into a communication signal that is transmitted to the electronic circuitry within the control unit 20 via the communication cable 42 or radio transmission. The electronic circuitry calculates the position and motion of the receiver unit 40 with respect to the transmitter unit 30. The electronic circuitry displays the position upon the display screen 28 including actual measurements of the total distance away from each other. If the user needs to turn left, the turn left indicator 23 is activated by the electronic circuitry. If the user needs to turn right, the turn right indicator 21 is activated by the electronic circuitry. The process continues until the conventional ball hitch 15 is directly below the coupler of the trailer hitch 12 after which the buzzer 25 and the stop indicator light 27 are activated informing the user to stop backing up. The user then exits the vehicle 14 and lowers the manual jack 13 for allowing coupling of the trailer hitch 12 to the conventional ball hitch 15. The user then removes the transmitter unit 30 and the receiver unit 40 from the trailer hitch 12 and bumper 16 respectively placing them with the storage case 50 as shown in FIG. 4 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A trailer hitch alignment system, comprising:
    a control unit;
    a receiver unit attachable to a vehicle adjacent a ball hitch, wherein said receiver unit is in communication with said control unit;
    a vertically elongated transmitter unit attachable to a trailer hitch of a trailer adjacent a coupler, wherein said transmitter unit transmits a locating signal that is detected by said receiver unit; and
    a locating light attached to an upper end of said transmitter unit;
    wherein said control unit includes:
        a turn left indicator attached to said housing and electrically connected to said electronic circuitry, wherein said left turn indicator is comprised of a plurality of vertically orientated strength lights that display an amount of turning required; and
        a turn right indicator attached to said housing and electrically connected to said electronic circuitry, wherein said right turn indicator is comprised of a plurality of vertically orientated strength lights that display an amount of turning required.

2. The trailer hitch alignment system of claim 1, wherein said control unit comprises:
    a housing;
    an electronic circuitry within said housing in communication with said receiver unit; and
    a display screen within said housing and electrically connected to said electronic circuitry.

3. The trailer hitch alignment system of claim 2, wherein said electronic circuitry calculates a position of said receiver unit from said transmitter unit.

4. The trailer hitch alignment system of claim 3, wherein said electronic circuitry displays said position of said receiver unit upon said display screen.

5. The trailer hitch alignment system of claim 4, wherein said control unit includes a keypad electrically connected to said electronic circuitry for allowing entry of information into said electronic circuitry.

6. The trailer hitch alignment system of claim 1, wherein said control unit further includes a buzzer within said housing electrically connected to said electronic circuitry.

7. The trailer hitch alignment system of claim 6, wherein said control unit further includes a stop indicator light within said housing electrically connected to said electronic circuitry.

8. The trailer hitch alignment system of claim 7, wherein said display screen includes a hitch indicia representing said trailer hitch.

9. The trailer hitch alignment system of claim 8, wherein said control unit includes a clip for removable attachment to a conventional visor within said vehicle.

10. A trailer hitch alignment system, comprising:
    a control unit;
    a receiver unit attachable to a vehicle adjacent a ball hitch, wherein said receiver unit is in communication with said control unit;
    a vertically elongated transmitter unit attachable to a trailer hitch of a trailer adjacent a coupler, wherein said transmitter unit transmits a locating signal that is detected by said receiver unit;
    wherein said transmitter unit includes a transmitter base having a first cavity for removably receiving a transmitter antenna, wherein said transmitter antenna has a height sufficient for a user to view from said vehicle;
    wherein said receiver unit includes a receiver base having a second cavity for removably receiving a receiver antenna that detects said locating signal; and
    a locating light attached to an upper end of said transmitter unit wherein said control unit includes:
        a turn left indicator attached to said housing and electrically connected to said electronic circuitry, wherein said left turn indicator is comprised of a plurality of vertically orientated strength lights that display an amount of turning required; and
        a turn right indicator attached to said housing and electrically connected to said electronic circuitry, wherein said right turn indicator is comprised of a plurality of vertically orientated strength lights that display an amount of turning required.

11. The trailer hitch alignment system of claim 10, wherein said control unit comprises:
    a housing;
    an electronic circuitry within said housing in communication with said receiver unit; and
    a display screen within said housing and electrically connected to said electronic circuitry.

12. The trailer hitch alignment system of claim 11, wherein said electronic circuitry calculates a position of said receiver unit from said transmitter unit.

13. The trailer hitch alignment system of claim 12, wherein said electronic circuitry displays said position of said receiver unit upon said display screen.

14. The trailer hitch alignment system of claim 13, wherein said receiver base and said transmitter base each include at least one magnet for removable attachment to a metal surface.

15. The trailer hitch alignment system of claim 10, wherein said control unit further includes a buzzer within said housing electrically connected to said electronic circuitry.

16. The trailer hitch alignment system of claim 15, wherein said control unit further includes a stop indicator light within said housing electrically connected to said electronic circuitry.

17. The trailer hitch alignment system of claim 16, wherein said transmitter antenna includes at least one visibility strip.

18. The trailer hitch alignment system of claim 17, wherein said control unit includes a clip for removable attachment to a conventional visor within said vehicle.

* * * * *